Dec. 20, 1966  B. A. SILARD ET AL  3,293,540
TEMPERATURE COMPENSATED CIRCUIT ARRANGEMENTS
Filed April 8, 1964  4 Sheets-Sheet 1

INVENTORS.
Bela A. Silard
Herbert Schulkind
BY
Michael S. Striker
RH

INVENTORS.
Bela A. Silard
Herbert Schulkind
BY
Michael S. Striker

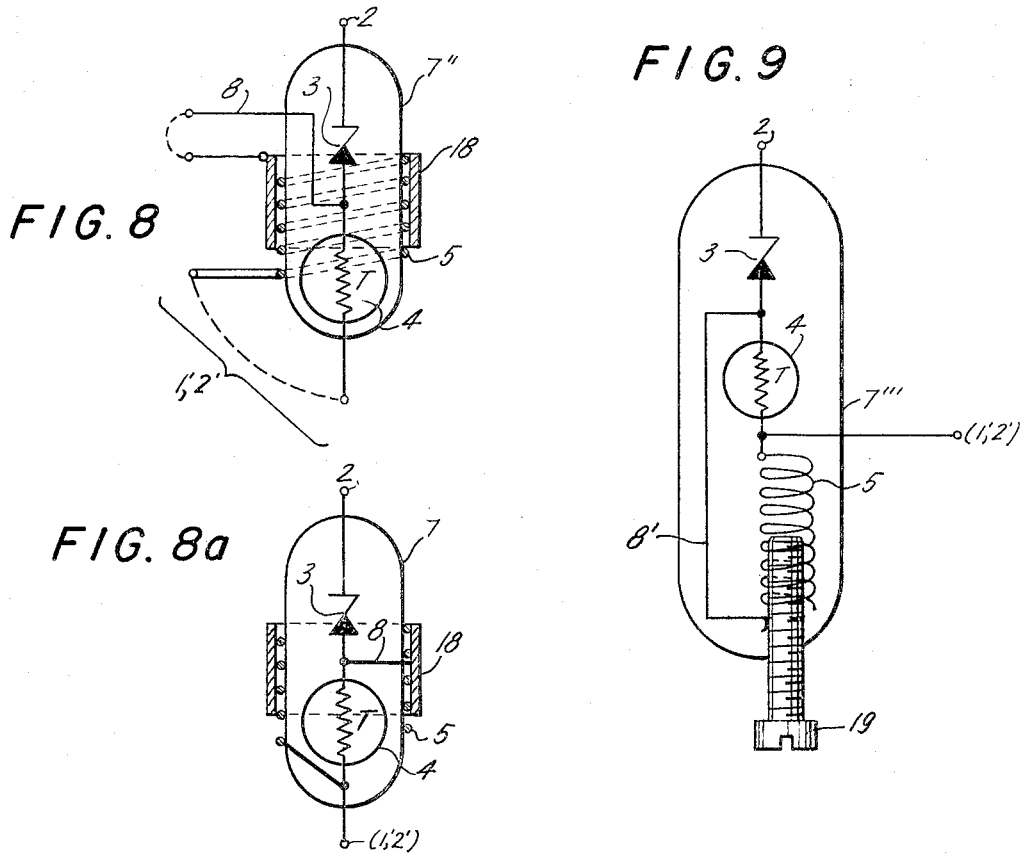
FIG. 8
FIG. 8a
FIG. 9
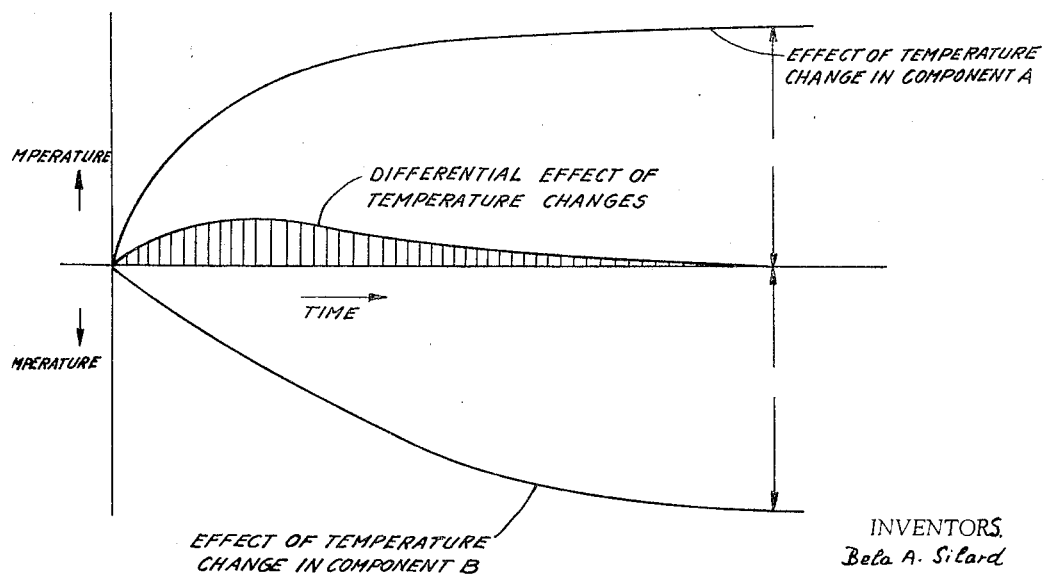
FIG. 10

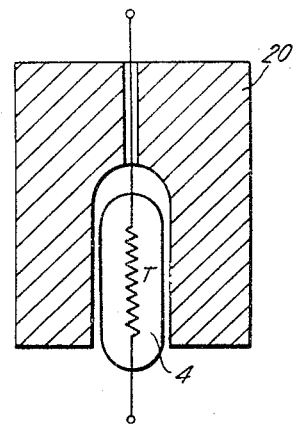
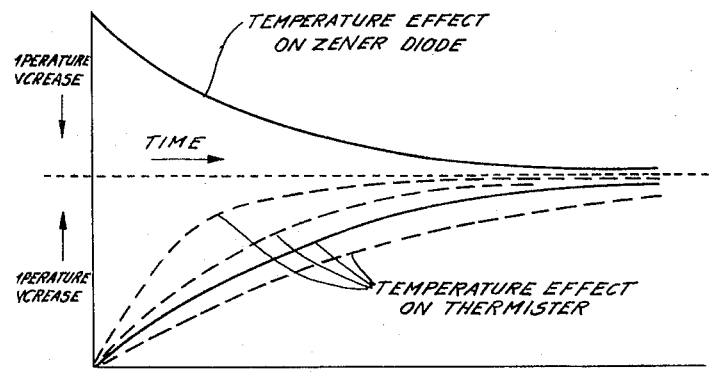
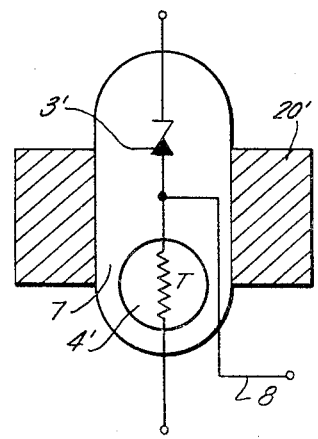
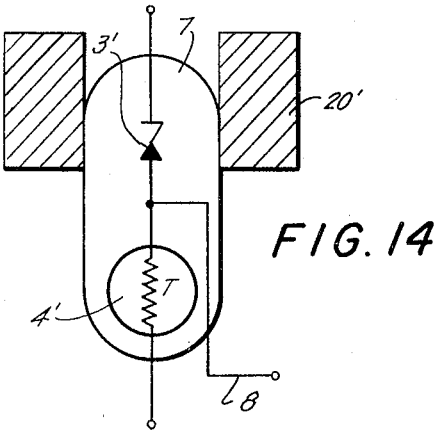
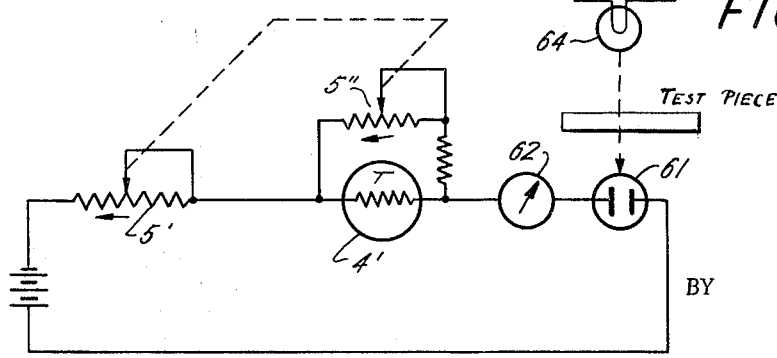

United States Patent Office 3,293,540
Patented Dec. 20, 1966

3,293,540
TEMPERATURE COMPENSATED CIRCUIT
ARRANGEMENTS
Bela A. Silard, Pleasantville, and Herbert Schulkind, Laurelton, N.Y., assignors to Photovolt Corporation, New York, N.Y.
Filed Apr. 8, 1964, Ser. No. 358,304
2 Claims. (Cl. 323—68)

The present invention relates to temperature compensated circuit arrangements. More particularly, the invention relates to improvements in electric and electronic equipment and circuits and components intended to stabilize circuits in which the effect of thermal changes in some of the components is compensated by counterbalancing effects of thermal changes in other components provided for this purpose. The invention also relates particularly to improvements in temperature compensated circuits in which the effects of thermal changes in voltage or current stabilizing components are counteracted by the effects of thermal changes in temperature-sensitive resistors. More specifically, the invention relates to Zener diode-stabilized power supplies in electronic circuits for the amplification of D.C. signals, temperature-compensated by means of thermistors.

The principal object of the present invention is to provide new and improved temperature compensated circuit arrangements.

One object of the present invention is to provide circuit arrangements for providing very close compensation for changing temperature.

Another object is to provide temperature compensated circuit arrangements utilizing inexpensive temperature sensitive resistors.

Another object is to provide temperature compensated circuit arrangements of simple structure which are easily assembled and adjusted.

Another object is to provide temperature compensated circuit arrangements with considerably reduced initial warm-up periods.

Another object is to provide temperature compensated circuit arrangements with substantially no drift.

Another object is to provide temperature compensated circuit arrangements in which the influence of changing ambient temperatures to which the circuit is exposed is considerably reduced.

Still another object of the present invention is to provide temperature compensated circuit arrangements in which it is easy to adjust the rise time characteristics of the temperature-sensitive compensating component so as to match the rise time characteristics of the other parts of the circuit.

Some voltage stabilizing components of power supplies, particularly Zener diodes, are very efficient in eliminating the effects of supply voltage changes upon other parts of the circuit but are considerably affected by temperature changes. Thus, the voltage or current supplied to the other parts of the circuit will change as the temperature of the voltage stabilizing component changes. Such temperature changes may be caused both by heat dissipation in the voltage stabilizing component itself, by heating up of other parts of the equipment as it is energized, and by ambient temperature changes.

Zener diodes are particularly susceptible to temperature rise due to heat developed in them under the influence of the current passing through them and therefore need exceedingly efficient and accurate temperature compensation for this very effect. Other types of voltage stabilizers, such as, for example, gas discharge tubes, may be more affected by temperature rise due to heat from other circuit components in the same equipment and therefore require compensation for this latter influence.

In these cases, and particularly in the manufacture of D.C. amplifiers having balanced or bucking circuits, in which high gain and high stability are required, the attaining of sufficiently close temperature compensation has so far been difficult and expensive. One reason is the limited predictability of the temperature rise of the voltage stabilizing component, since this depends, among other things, upon the actual characteristics of the particular specimen of that component and its location in the equipment. Another reason is the uncertainty of the voltage output versus temperature characteristics of that particular specimen. Another reason is the limited predictability of the temperature rise of the compensating component, since this too depends, among other things, upon the location in the equipment. Still another reason is the uncertainty of the resistance versus temperature characteristics of the temperature compensating component.

It is obvious that the closer the compensation is to be, the narrower one will have to draw the tolerances for the above mentioned characteristics of the voltage stabilizing and the temperature compensating components, thereby increasing the cost of manufacturing these components. The manufacturing of the equipment utilizing such components also becomes expensive if, in order to avoid using costly individual and separate components made with characteristics within narrow tolerances, one employs cheaper components within wider tolerances but atempts to select sets of voltage stabilizing and temperature compensating components by matching or pairing. It has been tried to minimize these difficulties by reducing at least the uncertainty of the relationship of the temperature of Zener diodes and that of thermistors by assembling one of each into a permanently and closely integrated solid unit of small size. However, this approach has the shortcoming that if the two components in the so assembled unit do not yield an acceptable pair, the entire unit becomes useless because no pairing with components in other so assembled units is then possible any more.

In accordance with the present invention, our temperature compensated circuit arrangement comprises, in circuit with the components whose thermal change is to be compensated (e.g., a voltage stabilizing component), a temperature sensitive compensating component (e.g., a thermistor) of such characteristics and so arranged and connected that, on the one hand, the latter component is capable of overcompensating the effect of temperature change upon the former components, and on the other hand the relationship between the magnitudes of the effect to be compensated and of the compensating effect can be modified by adjustment until the actually required exact amount of compensation is obtained.

In the figures, the same components are indicated by the same reference numerals.

In order that the present invention may be readily carried into effect, it will now be described with reference to the accompanying drawings, wherein.

Figure 5:
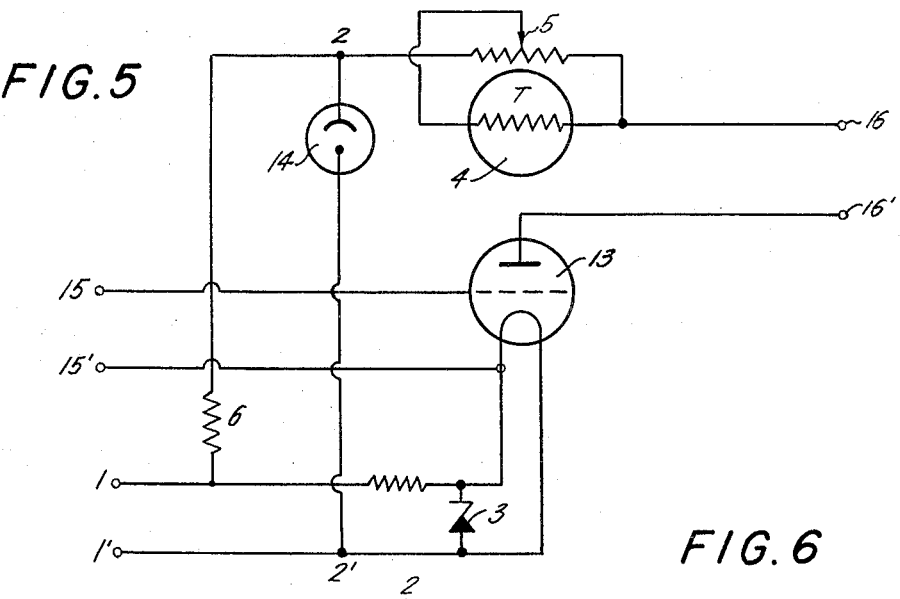
FIG. 5 is a circuit diagram of an embodiment of an 3,293,540 amplifier circuit arrangement utilizing the temperature compensated circuit arrangement of the present invention.
Figure 6:
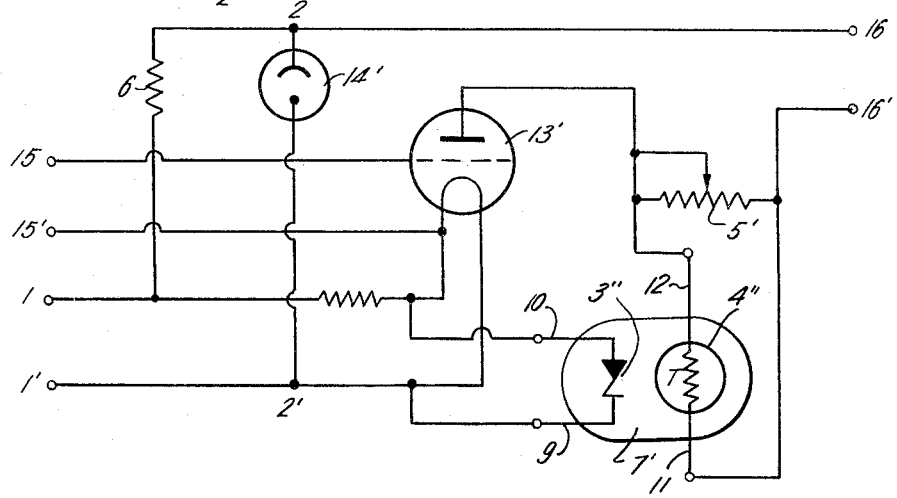
Figure 7:
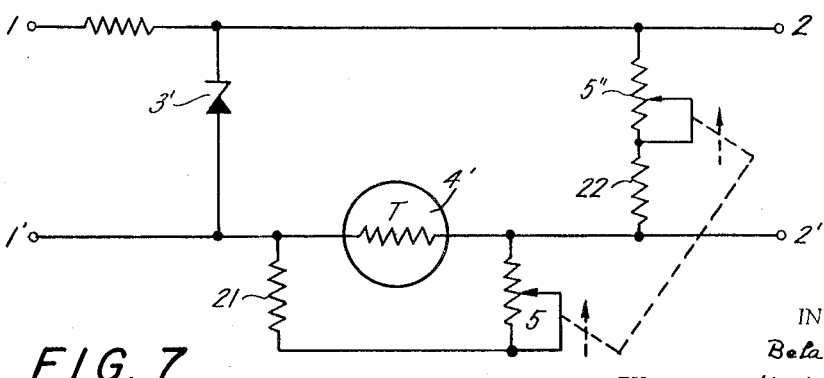

FIG. 6 is a circuit diagram of a modification of the embodiment of FIG. 5;

FIG. 7 is a circuit diagram of another embodiment of a temperature compensated circuit arrangement of the present invention;

FIG. 8 is a diagram, partly in section, of an embodiment of an adjustable temperature compensating unit which may be utilized in the temperature compensated circuit arrangements of the present invention;

FIG. 8a is a modification of FIG. 8;

FIG. 9 is a modification of the embodiment of FIG. 8;

FIG. 10 is a graphical presentation illustrating the lagging of the effect of one temperature change behind that of the other;

FIG. 11 is a diagram, partly in section, of an embodiment of an adjustable temperature change compensating unit which may be utilized in the temperature compensated circuit arrangements of the present invention;

FIG. 12 is a graphical presentation illustrating the changing of the rate of the temperature increase of one of two components;

FIGS. 13 and 14 are diagrams, partly in section, illustrating two different conditions of adjustment of another embodiment of an adjustable temperature change compensating unit which may be utilized in the temperature compensated circuit arrangement of the present invention; and FIG. 15 is a circuit diagram of an embodiment of a transmission photometer circuit arrangement utilizing an embodiment of the temperature compensated circuit arrangement of the present invention.

Figure 1:
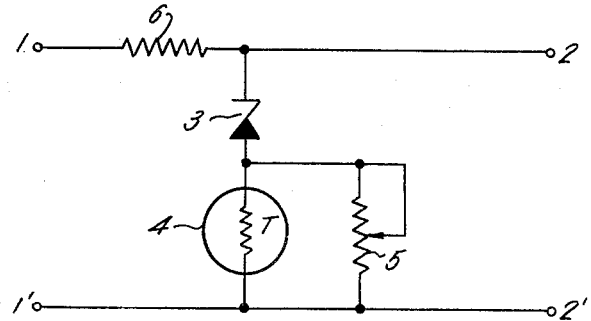
FIG. 1 is a circuit diagram of an embodiment of a temperature compensated circuit arrangement of the present invention.

In FIG. 1, input terminals 1 and 1' are connected to a suitable source of electrical energy or power supply. Output terminals 2 and 2' are connected to a load. A voltage stabilizing Zener diode 3 is connected in series with a thermistor 4 across the output terminals 2 and 2'. A variable resistor (rheostat) 5 is shunted across the thermistor 4 and a resistor 6 is connected in the circuit between the input terminal 1 and the output terminal 2. The adjustment of the magnitude of temperature compensation from an initial point of overcompensation while the resistance 5 is undiminished, is made by reducing the effective resistance of the rheostat 5 and thereby the effectiveness of the thermistor 4 empirically to the required point.

The advantages of the arrangement of FIG. 1, or of hereinafter described arrangements, may be combined with the improved performance of a Zener diode 3' when assembled with a thermistor 4' in a single integrated unit 7. This may be achieved, in accordance with the present invention, by providing such "temperature compensated" Zener diode unit with an extra lead 8 at the common terminal of the Zener diode and the thermistor, as shown in FIG. 2, permitting the use of the lead 8 for connecting an attenuator as described above.

Figure 2:
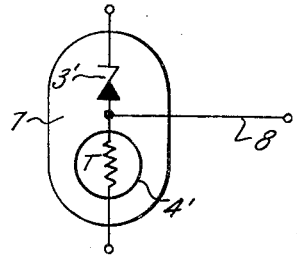
FIG. 2 is a diagram of an embodiment of a temperature compensating unit which may be utilized in the temperature compensated circuit arrangements of the present invention.

The utilization of the temperature compensating unit 7 of FIG. 2 permits the achievement of a very high degree of stability of the voltage supplied to the load. This results from two effects, namely, the effect of a close relationship of the temperature of the Zener diode to that of the thermistor and the possibility of adjustment of the magnitude of compensation by the thermistor by means of additional circuitry connected to the extra lead 8 and to another suitable point or points in the circuit.

Figure 3:
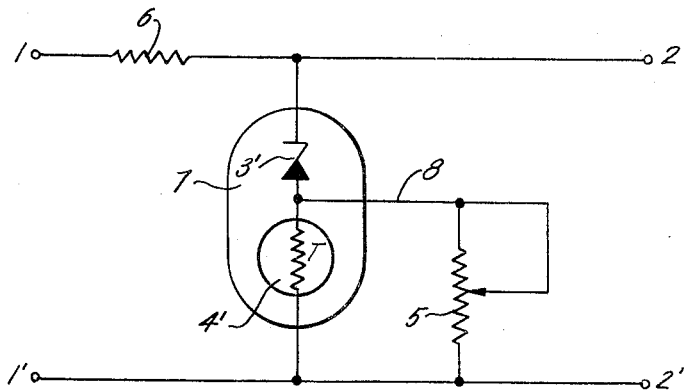
FIG. 3 is a circuit diagram of an embodiment of a temperature compensated circuit arrangement of the present invention in which the temperature compensating unit of FIG. 2 is utilized in the circuit arrangement of FIG. 1.

FIG. 3 illustrates a combination of the temperature compensating unit 7 with the circuit arrangement of FIG. 1 and is thus another embodiment of a temperature compensated circuit arrangement of the present invention. The arrangement of FIG. 3 represents one embodiment of the present invention which is capable of assuring, by combined advantages, a very high degree of stability, at the proper setting of the rheostat or variable resistor 5.

Figure 4:
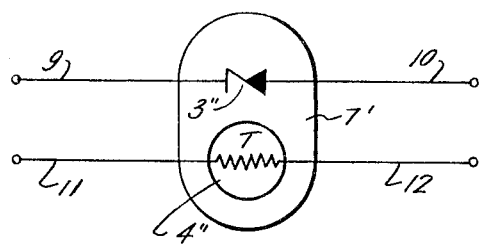
FIG. 4 is a diagram of another embodiment of a temperature compensating unit which may be utilized in the temperature compensated circuit arrangement of the present invention.

In some cases, it is of advantage to be able to connect a thermistor in the circuit at a point where neither of its terminals is common with a terminal of the voltage stabilizing Zener diode. In such application, another embodiment of a temperature compensating unit which may be utilized in the temperature compensated circuit arrangements of the present invention is shown in FIG. 4. In the embodiment of FIG. 4, the thermistor-compensated Zener diode unit 7', which includes the thermistor 4'' and the Zener diode 3'', utilizes independent, separate leads 9 and 10 for the terminals of the Zener diode 3'' and independent, separate leads 11 and 12 for the terminals of the thermistor 4''. The leads 9, 10, 11, and 12 are not interconnected within the unit 7'.

FIG. 5 is a circuit diagram of an embodiment of an amplifier circuit arrangement utilizing the temperature compensated circuit arrangement of the present invention. In the circuit arrangement of FIG. 5, the thermistor 4 compensates for the composite effects of temperature change in more components than just one Zener diode 3. The additional components are an amplifier tube 13 and a voltage stabilizing gas discharge tube 14. The input signal is supplied via input terminals 15 and 15' and the output signal is derived via output terminals 16 and 16'.

FIG. 6 is a circuit diagram of a modification of the embodiment of FIG. 5. In the circuit arrangement of FIG. 6, the temperature compensating unit of FIG. 4 is utilized. In the circuit of FIG. 5, the thermistor 4 is positioned close to both the amplifier tube 13 and the gas discharge tube 14. Thus the temperature of the thermistor 4'' is close to that of tubes 13 and 14, whereas in the circuit arrangement of FIG. 6, the temperature of the thermistor 4'' is close to that of Zener diode 3''. In some instances the circuit arrangement of FIG. 5 provides a greater advantage. In other instances, the circuit arrangement of FIG. 6 provides a greater advantage, namely when compensation of the temperature effect in the Zener diode is more critical than that of the temperature effect in the tubes.

FIG. 7 is a circuit diagram of another embodiment of a temperature compensated circuit arrangement of the present invention. The purpose of the circuit arrangement of FIG. 7 is to facilitate the empirical adjustment of the attenuation of the amount of compensation by the thermistor by arrangement of the variable resistance networks, and its components serving such purpose, in such a manner that the current flowing through the thermistor does not change while such adjustment is being made.

In the circuit arrangement of FIG. 7, it is possible simply to observe, for an initial setting of the adjustment, the change of the output caused by the heating up of the equipment from an initial cold state to a final steady state, and then to make the adjustment in one direction or the other, as required, in a single step of adjustment by restoring the output to its initial value. Thus, in the arrangement of FIG. 7, it is not necessary to first make a tentative correction after a first warm-up by making an adjustment and then repeat the test from cold state to warm state and determine whether thereafter there is still further change to be compensated for by further adjustment. This is due to the fact that in the arrangement of FIG. 7 the resetting of the adjustment has no effect on the current flowing through the thermistor. Consequently, no change in the final temperature of the thermistor due to the adjustment need be expected so that no further change of the final voltage drop across the thermistor will occur after the adjustment.

The embodiment of FIG. 7 utilizes two variable resistors 5 and 5''. The variable resistors 5 and 5'' may be rheostats, mechanically linked, for example with coupled shafts, as indicated schematically, to form a double rheostat. A resistor 21 is connected in series with the variable resistor 5 across a thermistor 4' and a resistor 22 is connected in series with the variable resistor 5'' across the output terminals 2, 2'.

The values of the components of the arrangement of FIG. 7 are so determined that when the adjustment is made at 5 and 5″, the current through the thermistor is not changed, but the effect of change of resistance of the thermistor, as a consequence of its temperature change, is controlled to vary with respect to the voltage output, thereby compensating exactly the voltage change due to temperature change in the Zener diode.

In the arrangement of FIG. 7, the adjustable resistors 5 and 5″ are implied to be ordinary, that is not temperature sensitive, resistors. However, these, or some of them, may advantageously be temperature sensitive resistors having temperature coefficients either similar or opposite to the temperature coefficient of the main temperature compensating component of thermistor 4′, depending on the type of network by means of which they are connected to the component or thermistor 4′, but in any event so that their change with changing temperature will counteract, or oppose, or attenuate, the effect of temperature change on the component or thermistor 4′.

Furthermore, in the arrangement of FIG. 7, the adjustment resistors 5 and 5″ are positioned apart from the temperature sensitive component or thermistor 4′. This is not necessarily so, and in many cases such as that hereinafter described, it is more convenient to have the adjustable resistors, either one or some of them, combined in one unit with the thermistor.

FIG. 8 is a diagram of an embodiment of an adjustable temperature compensating unit which may be utilized in the temperature compensated circuit arrangements of the present invention. The variable resistor or rheostat 5 is a coil of bore wire wound around a compact body 7″ in which a Zener diode 3 and a thermistor 4 are enclosed or embedded. A slider 18, which is adjustable with reference to its position, may be moved down or up and is thereby used to short-circuit more or less of the coil 5 and thereby reduce or increase the effective resistance of said coil in the circuit. The connections by dotted lines are implied to be external ones, serving to establish a circuit as shown in FIG. 1. However, in FIG. 8a these are provided as internal connections. The arrangements of FIGS. 8 and 8a are particularly inexpensive embodiments of the adjustable temperature compensating unit of the present invention.

FIG. 9 is a modification of the embodiment of FIG. 8. In FIG. 9, the variable resistance coil 5 is housed or embedded in container 7‴ and the slider 18 of FIG. 8 is replaced by an adjustable screw 19 whose threads fit the convolutions of the coil 5, and which is always in contact with lead 8′. The aforedescribed units of the present invention permit the achievement of high stability in circuits of the types described, easily and inexpensively. This is accomplished by making the output voltage of the power supply, or any other voltage across any given points of the circuit, or the current through any given component or load in the circuit, after the equipment has become warm, the same as such voltage or current was when the equipment was still cold before the power was provided. However, this does not necessarily eliminate a temporary change in such voltage or current during the time the equipment heats up. This is due to the fact that the change in some components may run ahead of that in others. More particularly, the effect of changing temperature in the thermistor may be faster or slower in developing than the change in the Zener diode.

The integrated units shown in FIGS. 2, 3, 4 and 6 are preferably also enclosed or imbedded in a compact object 7″ of the type shown in FIG. 8 or housed or imbedded in a container 7‴ of the type shown in FIG. 9.

FIG. 10 is a graphical presentation illustrating how the effect of one temperature change may lag behind that of the other and thereby produce a temporary differential effect, even though in the final steady state one has caught up with the other so that the differential effect disappears after a while only.

In accordance with the present invention, such difficulties are eliminated by providing at least one heat conveying component which, by drawing away heat from the component whose temperature change due to heating runs too fast ahead, will delay such temperature change. Furthermore, by making the effectiveness of the heat conveying component adjustable, it is possible to set the speed of the development of the change at exactly that rate which is required to keep pace with the change that it is intended to compensate for. FIG. 11 illustrates one way of achieving this.

FIG. 11 is a diagram of an embodiment of an adjustable temperature change compensating unit which may be utilized in the temperature compensated circuit arrangements of the present invention. In FIG. 11, a heat sink 20 is provided and a thermistor 4 is slidably mounted in said heat sink. The adjustability of the effectiveness of the heat sink 20, and thereby that of the speed of heating of the thermistor 4, is obtained by slidably moving said thermistor in or out of the aperture or opening of said heat sink.

FIG. 12 is a graphical presentation illustrating how, by changing the rate of temperature increase in one of two components, which are intended to compensate each other, the rate of temperature increase is reduced or increased from unsatisfactory conditions, represented by broken lines, to a final desired condition indicated by a solid line.

FIGS. 13 and 14 are diagrams, partly in section, illustrating different conditions of another embodiment of an adjustable temperature change compensating unit which may be utilized in the temperature compensated circuit arrangements of the present invention. In FIGS. 13 and 14, a temperature compensating unit 7 of the type of FIG. 2 is slidably mounted in a heat sink 20′. The heat sink 20′ draws away heat from both the Zener diode 3′ and the thermistor 4 incorporated in the temperature compensating unit 7. The heat sink 20′ draws more heat from the closer component than from the farther one. Thus, by sliding the temperature compensating unit 7 in one direction or the other in the passage provided through the heat sink 20′, it is possible to increase the effect of the heat sink on one of the two components of said temperature compensating unit and thereby delay its heating. At the same time, the effectiveness of the heat sink on the other component of the temperature compensating unit 7 is minimized, thereby speeding up the rate of temperature increase.

In the afore-described arrangement of heat sinks, which may be replaced, in accordance with the present invention, by other types of heat convecting or heat conducting arrangements, not only is the speed of the temperature rise in the compensating and/or compensated components influenced, but the magnitude of the temperature rises is also influenced. Since by affecting the magnitude of the temperature rise, the changes that are to be compensated or that serve for compensation are influenced, it will be understood that in certain cases adjustment of the heat sinking conditions alone may suffice for compensation even without electrical attenuation, as hereinbefore described. Even so, the principal feature of the present invention is the provision of a compensating component which in itself is capable of overcompensation and whose compensating effect is brought by attenuation to that level which is just exactly the one required for actual compensation.

Although the hereinbefore described embodiments and the corresponding illustrative figures are concerned with electronic circuits and their typical components, the scope of the present invention relating to temperature compensation includes electrical circuits which may contain also such components of different types such as transformers, lamps, photocells, in short, any other components whose output or resistance or any other characteristics change with temperature. In such applications, the basic principles of the present invention may be utilized to provide compensation for the changes in any or all of these components, as illustrated in FIG. 15.

FIG. 15 is a circuit diagram of an embodiment of a transmission photometer (sometimes known as a colorimeter) utilizing an embodiment of the temperature compensated circuit arrangement of the present invention. In FIG. 15, a thermistor 4' with attenuating adjustable resistors 5' and 5" is connected in series with a photocell 61 and an indicating meter 62. A light source arrangement 63 provides light via a lamp 64. In accordance with the present invention, the variable resistors 5' and 5" are adjusted to obtain from the thermistor 4' exactly the required compensation for the changes caused by temperature increase in all the other components. This is feasible because the thermistor 4', according to the present invention, is designed to overcompensate, if not attenuated, such other changes.

While the invention has been described by means of specific examples and in specific embodiments, we do not wish to be limited thereto, for obvious modifications will occur to those skilled in the art without departing from the spirit and scope of the invention.

What we claim is:

1. In an electrical circuit arrangements having at least one component having a characteristic which varies with temperature, in combination, a heat sink; temperature sensitive means connected to said component for overcompensating the effect on said component of a change in temperature, said temperature sensitive means comprising a resistor having a resistance which varies in a determined relationship with temperature, said temperature sensitive means being adjustably positioned in relation to said heat sink in a manner whereby the heat transfer between said temperature sensitive means and said heat sink may be adjusted; and adjustable attenuating means for reducing the compensating effect provided by said temperature sensitive means, said adjustable attenuating means comprising variable resistance means connected in circuit with said temperature sensitive means.

2. In an electrical circuit arrangement having at least one component having a characteristic which varies with temperature, in combination, a heat sink; a container housing said component; temperature sensitive means connected to said component and positioned in said housing for overcompensating the effect on said component of a change in temperature, said temperature sensitive means comprising a resistor having a resistance which varies in a determined relationship with temperature, said container being adjustably positioned in relation to said heat sink in a manner whereby the heat transfer between said component, said temperature sensitive means and said heat sink may be adjusted; and adjustable attenuating means for reducing the compensating effect provided by said temperature sensitive means, said adjustable attenuating means comprising variable resistance means connected in circuit with said temperature sensitive means.

References Cited by the Examiner

UNITED STATES PATENTS

| | | | |
|---|---|---|---|
| 2,764,731 | 9/1956 | Koerner | 323—69 |
| 2,971,160 | 2/1961 | Erdle | 330—143 X |
| 2,977,558 | 3/1961 | Hampton | 338—22 |
| 3,070,744 | 12/1962 | Upton | 323—69 |
| 3,192,469 | 6/1965 | Sapoff et al. | 323—68 |

JOHN F. COUCH, *Primary Examiner.*

A. D. PELLINEN, *Assistant Examiner.*